United States Patent
Besenmatter et al.

[11] 4,066,340
[45] Jan. 3, 1978

[54] BASIC LENS ASSEMBLY FOR SERIES OF ZOOM OBJECTIVES OF DIFFERENT VARIFOCAL RATIOS

[75] Inventors: Walter Besenmatter; Trude Muszumanski, both of Vienna; Irmgard Wendisch, Trumau, all of Austria

[73] Assignees: Karl Vockenhuber; Raimund Hauser, both of Vienna, Austria

[21] Appl. No.: 713,224

[22] Filed: Aug. 10, 1976

[30] Foreign Application Priority Data

Aug. 11, 1975 Austria .................................. 6230/75

[51] Int. Cl.² .......................... G02B 15/16; G02B 17/00
[52] U.S. Cl. ...................................... 350/184; 350/176; 350/185; 350/202
[58] Field of Search ............... 350/184, 185, 176, 186, 350/202

[56] References Cited

U.S. PATENT DOCUMENTS

| | | | |
|---|---|---|---|
| 3,273,457 | 9/1966 | Macher et al. | 350/184 X |
| 3,820,876 | 6/1974 | Macher | 350/184 |
| 3,891,304 | 6/1975 | Muszumanski | 350/184 |

Primary Examiner—Paul A. Sacher
Attorney, Agent, or Firm—Montague & Ross

[57] ABSTRACT

A zoom objective is disclosed which consists of a varifocal front lens group and a fixed rear lens group, the front lens group comprising a stationary first component of positive refractivity, axially shiftable second and third components of negative refractivity, and a stationary fourth component of positive refractivity separated from the rear lens group by a reflex prism adjoining a diaphragm space. The assembly of third and fourth components, prism and rear lens group can be selectively combined with various first and second components to provide zoom objectives of different varifocal ratios.

8 Claims, 5 Drawing Figures

BASIC LENS ASSEMBLY FOR SERIES OF ZOOM OBJECTIVES OF DIFFERENT VARIFOCAL RATIOS

FIELD OF THE INVENTION

Our present invention relates to an optical system of the pancratic type, more often referred to as a varifocal or zoom objective, and in particular to a lens assembly that can be complemented by a removable attachment in order to form such a varifocal system.

BACKGROUND OF THE INVENTION

Varifocal objectives as used in photographic or cinematographic zoom cameras, e.g. those designed for motion-picture film of the Super-8 type, conventionally consist of a four-component front group of adjustable magnification ratio juxtaposed with a rear group composed of several air-spaced lenses, the rear group constituting a fixed-focus basic objective to which the front group is permanently or removably attached. The two groups are generally separated by a diaphragm space which may also contain a reflex prism.

The varifocal front group usually consists of a stationary positive first component (which may be axially adjustable for focusing purposes), an axially shiftable negative second component which may be referred to as a variator, an axially shiftable negative third component which may be termed a compensator, and a stationary positive fourth component next to the diaphragm space.

By a suitably correlated axial displacement of the two negative components, the overall focal length of the system can be changed between a maximum value $f_{max}$ and a minimum value $f_{min}$ without any dislocation of the image plane of the objective.

Different varifocal ratios $f_{max}$ : $f_{min}$ can be obtained with the same basic objective and the same image-side half of the adjustable front group, i.e. the third and fourth components of that group, by substituting different lenses or lens combinations for the first two components of that group. Thus, only the object-side half of the front group of such an optical system needs to be interchangeable in order to provide a set of varifocal objectives of different zoom ranges.

OBJECTS OF THE INVENTION

The general aim of our invention is to provide a lens assembly for an interchangeable optical system of this type, constituting a basic objective and an adjoining half of a varifocal front group, which can be supplemented by two further components (one stationary, the other movable) to form a well-corrected objective with a selected zoom range.

Another object of this invention is to provide an optical system of the type referred to which is of relatively simple construction and therefore inexpensive to manufacture.

SUMMARY OF THE INVENTION

We have found, in accordance with the present invention, that a lens assembly satisfying these requirements consists of an axially shiftable lens in the form of a negative meniscus with a convex rear surface, an adjoining axially fixed biconvex lens preceding a diaphragm space, and a basic objective composed of four air-spaced lens members, i.e. two biconvex lenses, a biconcave lens and another biconvex lens.

These six lenses, whose parameters will be specified hereinafter, may form an invariable part of a zoom objective of a Super-8 motion-picture camera, for example, to be selectively complemented by interchangeable attachments comprising each a set of lenses which constitute the stationary front component and the first axially shiftable component of the varifocal group of such an objective.

BRIEF DESCRIPTION OF THE DRAWING

The invention will now be described in detail with reference to the accompanying drawing in which.

SPECIFIC DESCRIPTION

Figure 1:
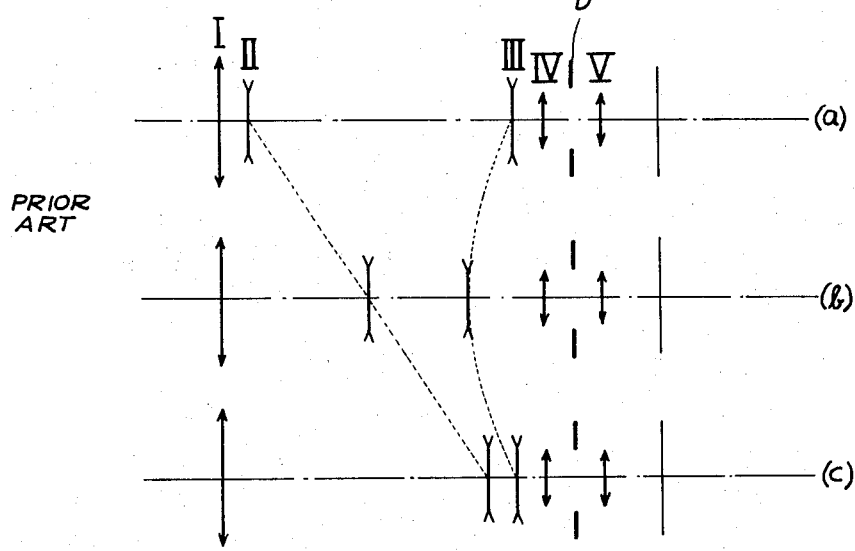
FIG. 1 diagrammatically shows the layout of a varifocal objective, known per se, to which the invention is applicable.

As illustrated in FIG. 1, a zoom objective of conventional type comprises a stationary positive first component I, an axially shiftable negative second component II, another axially shiftable negative third component III, a stationary positive fourth component IV and a rear lens group or basic objective V, components IV and V being separated by a space containing a diaphragm D. Graphs (a), (b) and (c) of FIG. 1 respectively show a wide-angle position with overall focal length $f_{min}$, an intermediate position with overall focal length $f_{med}$ and a telephoto position with overall focal length $f_{max}$.

In accordance with our present invention, components III, IV and V are common to different zoom objectives of progressively increasing varifocal ratios shown in FIGS. 2 - 5. These varifocal ratios have the approximate values of 4:1, 6:1, 8:1 and 10:1 with the specific lens parameters given below.

The following Table O lists the radii of curvature $r_6'$ - $r_{11}'$, the axial thicknesses $d_6$ - $d_{11}$, the refractive indices $n_d$ and the Abbe numbers $v_d$ of a lens $L_6$ constituting the component III, a lens $L_7$ constituting the component IV and four lenses $L_8$ - $L_{11}$ constituting the component V.

Table O also specifies an air space $s_7$ separating the lens $L_7$ from an adjoining reflex prism P, two air spaces $s_8'$ and $s_8''$ on opposite sides of diaphragm D between prism P and lens $L_8$, and air spaces $s_9$ - $s_{11}$ separating the lens members of component V. The air space $s_6$ intervening between lenses $L_6$ and $L_7$ is variable and meaningless in the absence of a front attachment comprising the first two components of the system.

TABLE O

| | | | $n_d$ | $v_d$ |
|---|---|---|---|---|
| $L_6$ | $r_6' = -0.867$ $r_6'' = -2.201$ | $d_6 = 0.05$ | 1.784 | 43.9 |
| $L_7$ | $r_7' = +1.399$ $r_7'' = -1.745$ | $d_7 = 0.120$ | 1.691 | 54.7 |
| | | $s_8' = 0.045$ | | |
| P | $r_p' = \infty$ $r_p'' = \infty$ | $d_p = 0.249$ | 1.517 | 64.2 |
| | | $s_8'' = 0.90$ | | |
| $L_8$ | $r_8' = +2.187$ $r_8'' = -3.174$ | $d_8 = 0.105$ | 1.744 | 44.8 |
| | | $s_9 = 0.025$ | | |

TABLE O-continued

| | | | | $n_d$ | $v_d$ |
|---|---|---|---|---|---|
| $L_9$ | $r_9' = +0.740$ $r_9'' = \infty$ | $d_9 = 0.120$ | | 1.744 | 44.8 |
| | | $s_{10} = 0.037$ | | | |
| $L_{10}$ | $r_{10}' = -0.986$ $r_{10}'' = +0.574$ | $d_{10} = 0.349$ | | 1.847 | 23.8 |
| | | $s_{11} = 0.060$ | | | |
| $L_{11}$ | $r_{11}' = +1.692$ $r_{11}'' = -0.593$ | $d_{11} = 0.234$ | | 1.735 | 41.4 |

In the foregoing and subsequent Tables the numerical values for the radii, thicknesses and separations are based on a value of unity for an intermediate focal length $f_{med}$.

Figure 2:
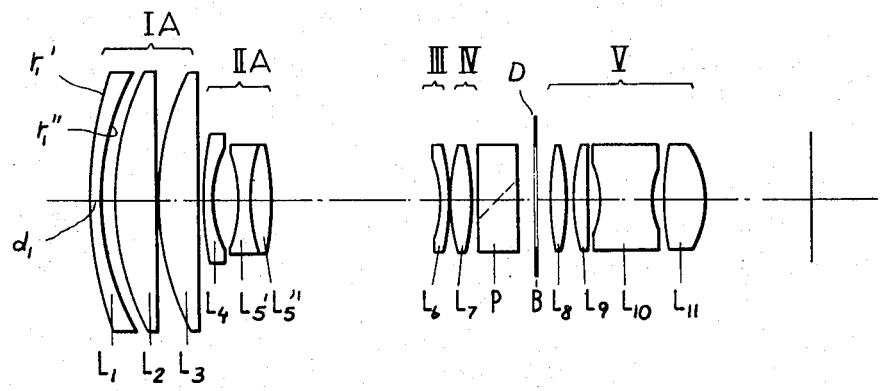
FIGS. 2 - 5 show four zoom objectives with different varifocal ratios sharing a common lens assembly according to my invention.

In FIG. 2 a first component IA and a second component IIA complement the lens assembly $L_6 - L_{11}$ to form an objective whose overall focal length ranges between $f_{min} = 0.449$ and $f_{max} = 1.798$. Component IA consists of three air-spaced singlets, i.e. a negative lens $L_1$ and two positive lenses $L_2$, $L_3$. Component IIA consists of a singlet $L_4$ and a doublet $L_5'$, $L_5''$ with a positively refracting cemented surface of radius $r_5$. The radii $r_1' - r_5''$, thicknesses $d_1 - d_5$ and separations $s_1 - s_4$ of lenses $L_1 - L_5''$ are listed, together with their refractive indices $n_d$ and Abbe numbers $v_d$, in the following Table A which also gives the variable air space $s_5$ separating components IIA and III from each other in the three representative positions shown in FIG. 1. The invariable sum of air spaces $s_3$, $s_5$, $s_6$ has likewise been specified.

TABLE A

| | | | $n_d$ | $v_d$ |
|---|---|---|---|---|
| $L_1$ | $r_1' = +3.102$ $r_1'' = +1.499$ | $d_1 = 0.075$ | 1.805 | 25.4 |
| | | $s_1 = 0.075$ | | |
| $L_2$ | $r_2' = +1.620$ $r_2'' = \infty$ | $d_2 = 0.252$ | 1.603 | 60.6 |
| | | $s_2 = 0.005$ | | |
| $L_3$ | $r_3' = +1.620$ $r_3'' = \infty$ | $d_3 = 0.252$ | 1.603 | 60.0 |
| | $s_3$ (variable) | $\begin{cases} 0.030\ f_{min} \\ 0.641\ f_{med} \\ 0.947\ f_{max} \end{cases}$ | | |
| $L_4$ | $r_4' = +3.764$ $r_4'' = +0.571$ | $d_4 = 0.050$ | 1.713 | 53.8 |
| | | $s_4 = 0.167$ | | |
| $L_5'$ | $r_5' = -0.722$ | $d_5' = 0.050$ | 1.622 | 53.2 |
| $L_5''$ | $r_5 = +0.376$ $r_5'' = -6.448$ | $d_5'' = 0.132$ | 1.805 | 25.4 |
| | $s_5$ (variable) | $\begin{cases} 1.009\ f_{min} \\ 0.300\ f_{med} \\ 0.091\ f_{max} \end{cases}$ | | |
| | $s_3 + s_5 + s_6 = 1.109$ | | | |

Figure 3:
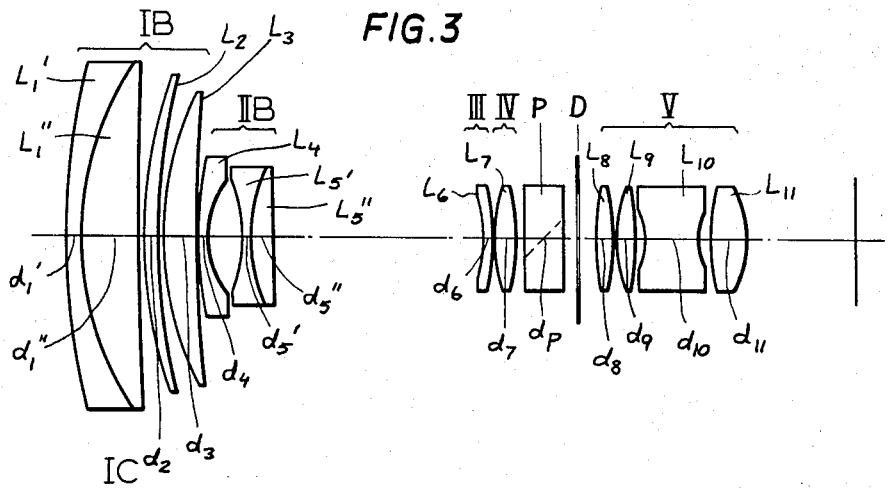

FIG. 3 shows a front attachment with components IB and IIB yielding an increased varifocal ratio. Component 1B differs from component IA by being a doublet consisting of lenses $L_1'$ and $L_1''$ of thicknesses $d_1'$ and $d_2''$, respectively. The cemented surface of this doublet, having a radius $r_1$, is of negative refractivity. The corresponding parameters are given in the following Table.

TABLE B

| | | | $n_d$ | $v_d$ |
|---|---|---|---|---|
| $L_1'$ | $r_1' = +6.077$ | $d_1' = 0.095$ | 1.805 | 25.4 |
| $L_1''$ | $r_1 = +1.922$ $r_1'' = \infty$ | $d_1'' = 0.369$ | 1.620 | 60.3 |
| | | $s_1 = 0.005$ | | |
| $L_2$ | $r_2' = +2.692$ $r_2'' = +4.940$ | $d_2 = 0.100$ | 1.658 | 50.9 |
| | | $s_2 = 0.005$ | | |
| $L_3$ | $r_3' = +1.838$ $r_3'' = +8.546$ | $d_3 = 0.219$ | 1.658 | 50.9 |
| | $s_3$ (variable) | $\begin{cases} 0.002\ f_{min} \\ 0.783\ f_{med} \\ 1.201\ f_{max} \end{cases}$ | | |
| $L_4$ | $r_4' = +6.649$ $r_4'' +0.561$ | $d_4 = 0.047$ | 1.691 | 54.7 |
| | | $s_4 = 0.219$ | | |
| $L_5'$ | $r_5' = -0.958$ | $d_5' = 0.047$ | 1.620 | 60.3 |
| $L_5''$ | $r_5 = +0.815$ $r_5'' = +16.823$ | $d_5'' = 0.145$ | 1.805 | 25.4 |
| | $s_5$ (variable) | $\begin{cases} 1.289\ f_{min} \\ 0.359\ f_{med} \\ 0.089\ f_{max} \end{cases}$ | | |
| | $s_3 + s_5 + s_6 = 1.316$ | | | |

This objective has focal lengths $f_{min} = 0.387$ and $f_{max} = 2.323$.

Figure 4:
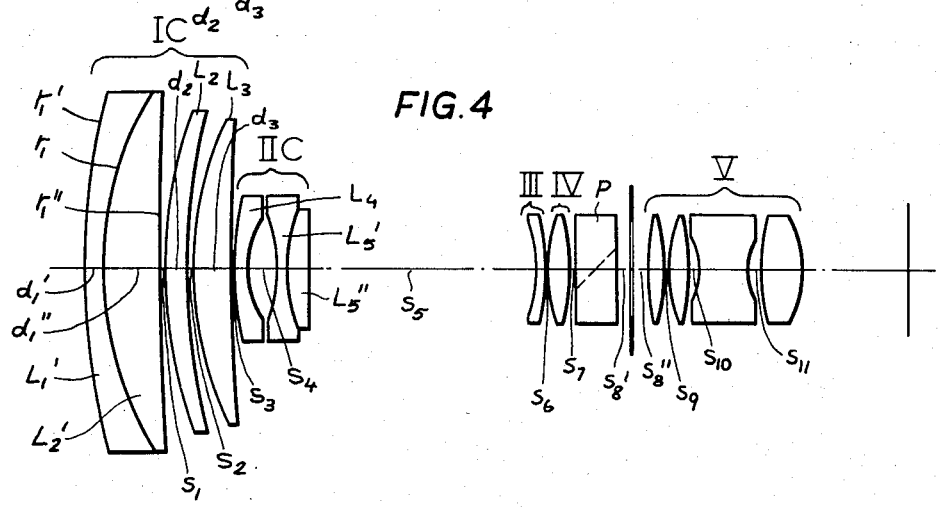

FIG. 4 shows a further attachment with components 1C and IIC differing from components IB and IIB only in their dimensions as given in the following Table:

TABLE C

| | | | $n_d$ | $v_d$ |
|---|---|---|---|---|
| $L_1'$ | $r_1' = +6.299$ | $d_1' = 0.100$ | 1.805 | 25.4 |
| $L_1''$ | $r_1 = +1.992$ $r_1'' = \infty$ | $d_1'' = 0.384$ | 1.620 | 60.3 |
| | | $s_1 = 0.005$ | | |
| $L_2$ | $r_2' = +2.790$ $r_2'' = +5.120$ | $d_2 = 0.130$ | 1.658 | 50.9 |
| | | $s_2 = 0.005$ | | |
| $L_3$ | $r_3' = +1.906$ $r_3'' = +8.868$ | $d_3 = 0.254$ | 1.658 | 50.9 |
| | $s_3$ (variable) | $\begin{cases} 0.040\ f_{min} \\ 0.880\ f_{med} \\ 1.332\ f_{max} \end{cases}$ | | |
| $L_4$ | $r_4' = +6.205$ $r_4'' = +0.524$ | $d_4 = 0.045$ | 1.691 | 54.7 |
| | | $s_4 = 0.204$ | | |
| $L_5'$ | $r_5' = -0.894$ | $d_5' = 0.045$ | 1.620 | 60.3 |
| $L_5''$ | $r_5 = +0.761$ $r_5'' = +15.587$ | $d_5'' = 0.135$ | 1.805 | 25.4 |
| | $s_5$ (variable) | $\begin{cases} 1.399\ f_{min} \\ 0.380\ f_{med} \\ 0.106\ f_{max} \end{cases}$ | | |
| | $s_3 + s_5 + s_6 = 1.462$ | | | |

In this instance, $f_{min} = 0.359$ and $f_{max} = 2.666$.

Figure 5:
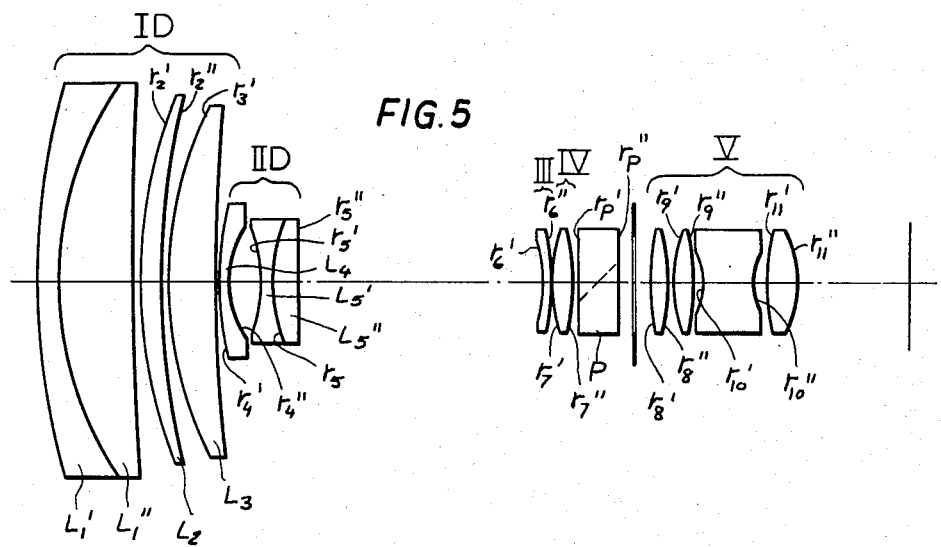

FIG. 5, finally, shows an attachment with components ID and IID which again differ from those of FIG. 3 only in their dimensions as listed below.

TABLE D

| | | | $n_d$ | $v_d$ |
|---|---|---|---|---|
| $L_1'$ | $r_1' = +6.032$ | $d_1' = 0.122$ | 1.805 | 25.4 |
| $L_1''$ | $r_1 = +1.993$ $r_1'' = \infty$ | $d_1'' = 0.478$ | 1.620 | 60.3 |
| | | $s_1 = 0.005$ | | |
| $L_2$ | $r_2' = +2.924$ $r_2'' = +6.172$ | $d_2 = 0.159$ | 1.652 | 50.9 |

TABLE D-continued

| | | | $n_d$ | $\nu_d$ |
|---|---|---|---|---|
| | | $s_2 = 0.005$ | | |
| $L_3$ | $r_3' = +2.094$ $r_3'' = +10.371$ | $d_3 = 0.319$ | 1.658 | 50.9 |
| | $s_3$ (variable) | $\begin{cases} 0.007\ f_{min} \\ 0.945\ f_{med} \\ 1.475\ f_{max} \end{cases}$ | | |
| $L_4$ | $r_4' = +6.979$ $r_4'' = +0.516$ | $d_4 = 0.050$ | 1.691 | 54.7 |
| | | $s_4 = 0.224$ | | |
| $L_5'$ | $r_5' = -0.381$ $r_5 = +0.750$ | $d_5' = 0.050$ | 1.620 | 60.3 |
| $L_5''$ | $r_5'' = +24.621$ | $d_5'' = 0.168$ | 1.805 | 25.4 |
| | $s_5$ (variable) | $\begin{cases} 1.485\ f_{min} \\ 0.331\ f_{med} \\ 0.016\ f_{max} \end{cases}$ | | |
| | $s_3 + s_5 + s_6 = 1.497$ | | | |

Here, $f_{min} = 0.338$ and $f_{max} = 3.141$.

In each of the instances represented by Tables A - D, the objective has a relative aperture of 1:1.8 and an image diagonal of 0.354.

The nonillustrated mechanism for displacing the two shiftable components in a correlated manner, as indicated by dotted curves in FIG. 1, may comprise two telescopable lens barrels with camming slots penetrated by guide pins on these components as is well known per se, the lens barrels interfitting for joint rotation but with independent slidability of the barrel of lens $L_6$ in the wide-angle position whereby that lens may be axially shifted for focusing in a macro range, e.g. as known from commonly owned U.S. Pat. Nos. 3,773,402 and 3,891,304.

From the foregoing Tables the individual focal lengths of the various components can be calculated as follows:

| | |
|---|---|
| component IA: $f_{IA} = +2.111$ | component IIA: $f_{IIA} = -0.612$ |
| component IB: $f_{IB} = +2.349$ | component IIB: $f_{IIB} = -0.587$ |
| component IC: $f_{IC} = +2.435$ | component IIC: $f_{IIC} = -0.548$ |
| component ID: $f_{ID} = +2.619$ | component IID: $f_{IID} = -0.540$ |
| component III: $f_{III} = -1.855$ | |
| component IV: $f_{IV} = +1.142$ | |
| component V: $f_V = +1.045$ | |

The varifocal front group consisting of components I-IV is afocal in each instance; thus, the width of the diaphragm space behind this group is immaterial.

We claim:

1. A lens assembly forming part of a varifocal optical system of the type wherein a front lens group constituted by two stationary positive components bracketing two axially shiftable negative components adjoins an axially fixed rear lens group of positive refractivity consisting of a plurality of air-spaced lens members, said lens assembly comprising:
   an axially shiftable negative lens $L_6$ constituting one of said negative components;
   an axially fixed positive lens $L_7$ constituting one of said stationary components; and
   two positive lenses $L_8$, $L_9$, a negative lens $L_{10}$ and another positive lens $L_{11}$ constituting said air-spaced lens members;
   said lenses $L_6 - L_{11}$ having radii of curvature $r_6' - r_{11}''$, axial thicknesses $d_6 - d_{11}$, refractive indices $n_d$ and Abbe numbers $\nu_d$ substantially as given in the following table along with air spaces $s_9 - s_{11}$ separating said lens members $L_8 - L_{11}$:

| | | | $n_d$ | $\nu_d$ |
|---|---|---|---|---|
| $L_6$ | $r_6' = -0.87$ $r_6'' = -2.20$ | $d_6 = 0.05$ | 1.78 | 44 |
| $L_7$ | $r_7' = +1.40$ $r_7'' = -1.75$ | $d_7 = 0.12$ | 1.69 | 55 |
| $L_8$ | $r_8' = +2.19$ $r_8'' = -3.17$ | $d_8 = 0.11$ | 1.74 | 45 |
| | | $s_9 = 0.03$ | | |
| $L_9$ | $r_9'' = +0.74$ $r_9'' = \infty$ | $d_9 = 0.12$ | 1.74 | 45 |
| | | $s_{10} = 0.04$ | | |
| $L_{10}$ | $r_{10}' = -0.99$ $r_{10}'' = +0.57$ | $d_{10} = 0.35$ | 1.85 | 24 |
| | | $s_{11} = 0.06$ | | |
| $L_{11}$ | $r_{11}' = +1.69$ $r_{11}'' = -0.59$ | $d_{11} = 0.23$ | 1.74 | 42 |

2. A lens assembly as defined in claim 1, further comprising a prism with planar faces inserted between said positive lenses $L_7$ and $L_8$, said prism being separated from lens $L_7$ by an air space $s_8'$ and from lens $L_8$ by an air space $s_8''$, the numerical values of said air spaces $s_8'$ and $s_8''$ together with the thickness $d_p$, refractive index $n_d$ and the Abbe number $\nu_d$ of said prism being substantially as follows:

| | | $n_d$ | $\nu_d$ |
|---|---|---|---|
| $s_8' = 0.05$ $s_8'' = 0.09$ | $d_p = 0.25$ | 1.52 | 64 |

3. The combination of a lens assembly as defined in claim 1 with a plurality of interchangeable sets of lenses constituting the other of said stationary components and the other of said axially shiftable components, said interchangeable sets complementing said lenses $L_6 - L_{11}$ to a varifocal objective with different ratios of maximum to minimum overall focal lengths.

4. The combination deffined in claim 3 wherein said ratios are approximately 4:1, 6:1, 8:1 and 10:1.

5. In combination, a lens assembly as defined in claim 1 and a set of lenses comprising first, second and third lens members $L_1$, $L_2$, $L_3$ constituting the other of said stationary components and fourth and fifth lens members $L_4$, $L_5' + L_5''$ constituting the other of said axially shiftable components, said lens members $L_1 - L_5''$ having radii of curvature $r_1' - r_5''$, axial thicknesses $d_1 - d_5''$, refractive indices $n_d$ and Abbe numbers $\nu_d$ substantially as given in the following table along with air spaces $s_1$, $s_2$ separating said lens members $L_1$, $L_2$, $L_3$, an air space $s_4$ separating said lens members $L_4$, $L_5' + L_5''$ and the sum of air spaces $s_3 + s_5 + s_6$ separating said stationary and axially shiftable components:

| | | | $n_d$ | $\nu_d$ |
|---|---|---|---|---|
| $L_1$ | $r_1' = +3.10$ $r_1'' = +1.50$ | $d_1 = 0.08$ | 1.81 | 25 |

-continued

|  |  |  | $n_d$ | $v_d$ |
|---|---|---|---|---|
|  |  | $s_1 = 0.08$ |  |  |
| $L_2$ | $r_2' = +1.62$ | $d_2 = 0.25$ | 1.60 | 61 |
|  | $r_2'' = \infty$ |  |  |  |
|  |  | $s_2 = 0.01$ |  |  |
| $L_3$ | $r_3' = +1.62$ | $d_3 = 0.25$ | 1.60 | 60 |
|  | $r_3'' = \infty$ |  |  |  |
| $L_4$ | $r_4' = +3.76$ | $d_4 = 0.05$ | 1.71 | 54 |
|  | $r_4'' = +0.57$ |  |  |  |
|  |  | $s_4 = 0.17$ |  |  |
| $L_5'$ | $r_5' = -0.72$ | $d_5' = 0.05$ | 1.62 | 53 |
|  | $r_5 = +0.88$ |  |  |  |
| $L_5''$ |  | $d_5'' = 0.13$ | 1.81 | 25 |
|  | $r_5'' = -6.45$ |  |  |  |
|  | $s_3 + s_5 + s_6 = 1.11$ |  |  |  |

6. In combination, a lens assembly as defined in claim 1 and a set of lenses comprising first, second and third lens members $L_1'+L_1''$, $L_2$, $L_3$ constituting the other of said stationary components and fourth and fifth lens members $L_4$, $L_5'+L_5''$ constituting the other of said axially shiftable components, said lens members $L_1'$ - $L_5''$ having radii of curvature $r_1'$ - $r_5''$, axial thicknesses $d_1'$ - $d_5''$, refractive indices $n_d$ and Abbe numbers $v_d$ substantially as given in the following table along with air spaces $s_1$, $s_2$ separating said lens members $L_1'+L_1''$, $L_2$, $L_3$, an air space $s_4$ separating said lens members $L_4$, $L_5'+L_5''$ and the sum of air spaces $s_3+s_5+s_6$ separating said stationary and axially shiftable components:

|  |  |  | $n_d$ | $v_d$ |
|---|---|---|---|---|
| $L_1'$ | $r_1' = +6.08$ | $d_1' = 0.10$ | 1.81 | 25 |
| $L_1''$ | $r_1 = +1.92$ | $d_1'' = 0.37$ | 1.62 | 60 |
|  | $r_1'' = \infty$ |  |  |  |
|  |  | $s_1 = 0.01$ |  |  |
| $L_2$ | $r_2' = +2.69$ | $d_2 = 0.10$ | 1.66 | 51 |
|  | $r_2'' = +4.94$ |  |  |  |
|  |  | $s_2 = 0.01$ |  |  |
| $L_3$ | $r_3' = +1.84$ | $d_3 = 0.22$ | 1.66 | 51 |
|  | $r_3'' = +8.55$ |  |  |  |
| $L_4$ | $r_4' = +6.65$ | $d_4 = 0.05$ | 1.69 | 55 |
|  | $r_4'' = +0.56$ |  |  |  |
|  |  | $s_4 = 0.22$ |  |  |
| $L_5'$ | $r_5' = -0.96$ | $d_5' = 0.05$ | 1.62 | 60 |
|  | $r_5 = +0.82$ |  |  |  |
| $L_5''$ |  | $d_5'' = 0.15$ | 1.81 | 25 |
|  | $r_5'' = +16.32$ |  |  |  |
|  | $s_3 + s_5 + s_6 = 1.32$ |  |  |  |

7. In combination, a lens assembly as defined in claim 1 and a set of lenses comprising first, second and third lens members $L_1'+L_1''$, $L_2$, $L_3$ constituting the other of said stationary components and fourth and fifth lens members $L_4$, $L_5'+L_5''$ constituting the other of said axially shiftable components, said lens members $L_1'$ - $L_5''$ having radii of curvature $r_1'$ - $r_5''$, axial thicknesses $d_1'$ - $d_5''$, refractive indices $n_d$ and Abbe numbers $v_d$ substantially as given in the following table along with air spaces $s_1$, $s_2$ separating said lens members $L_1''+L_1''$, $L_2$, $L_3$, an air space $s_4$ separating said lens members $L_4$, $L_5'+L_5''$ and the sum of air spaces $s_3+s_5+s_6$ separating said stationary and axially shiftable components:

|  |  |  | $n_d$ | $v_d$ |
|---|---|---|---|---|
| $L_1'$ | $r_1' = +6.30$ | $d_1' = 0.10$ | 1.81 | 25 |
| $L_1''$ | $r_1 = +1.99$ | $d_1'' = 0.38$ | 1.62 | 60.3 |
|  | $r_1'' = \infty$ |  |  |  |
|  |  | $s_1 = 0.01$ |  |  |
| $L_2$ | $r_2' = +2.79$ | $d_2 = 0.13$ | 1.66 | 51 |
|  | $r_2'' = +5.12$ |  |  |  |
|  |  | $s_2 = 0.01$ |  |  |
| $L_3$ | $r_3' = +1.91$ | $d_3 = 0.25$ | 1.66 | 51 |
|  | $r_3'' = +8.87$ |  |  |  |
| $L_4$ | $r_4' = +6.21$ | $d_4 = 0.05$ | 1.69 | 55 |
|  | $r_4'' = +0.52$ |  |  |  |
|  |  | $s_4 = 0.20$ |  |  |
| $L_5'$ | $r_5' = -0.89$ | $d_5' = 0.05$ | 1.62 | 60 |
|  | $r_5 = +0.76$ |  |  |  |
| $L_5''$ |  | $d_5'' = 0.14$ | 1.81 | 25 |
|  | $r_5'' = +15.59$ |  |  |  |
|  | $s_3 + s_5 + s_6 = 1.46$ |  |  |  |

8. In combination, a lens assembly as defined in claim 1 and a set of lenses comprising first, second and third lens members $L_1'+L_1''$, $L_2$, $L_3$ constituting the other of said stationary components and fourth and fifth lens members $L_4$, $L_5'+L_5''$ constituting the other of said axially shiftable components, said lens members $L_1'$ - $L_5''$ having radii of curvature $r_1'$ - $r_5''$, axial thicknesses $d_1'$ - $d_5''$, refractive indices $n_d$ and Abbe numbers $v_d$ substantially as given in the following table along with air spaces $s_1$, $s_2$ separating said lens members $L_1'$ + $L_1''$ $L_2$, $L_3$ an air space $s_4$ separating said lens members $L_4$, $L_5'$ + $L_5''$ and the sum of air spaces $s_3 + s_5 + s_6$ separating said stationary and axially shiftable components:

|  |  |  | $n_d$ | $v_d$ |
|---|---|---|---|---|
| $L_1'$ | $r_1' = 6.03$ | $d_1' = 0.12$ | 1.81 | 25 |
| $L_1''$ | $r_1 = 1.99$ | $d_1'' = 0.48$ | 1.62 | 60 |
|  | $r_1'' = \infty$ |  |  |  |
|  |  | $s_1 = 0.01$ |  |  |
| $L_2$ | $r_2' = 2.92$ | $d_2 = 0.16$ | 1.65 | 51 |
|  | $r_2'' = 6.17$ |  |  |  |
|  |  | $s_2 = 0.01$ |  |  |
| $L_3$ | $r_3' = 2.09$ | $d_3 = 0.32$ | 1.66 | 51 |
|  | $r_3'' = 10.37$ |  |  |  |
| $L_4$ | $r_4' = 6.98$ | $d_4 = 0.05$ | 1.69 | 55 |
|  | $r_4'' = 0.52$ |  |  |  |
|  |  | $s_4 = 0.22$ |  |  |
| $L_5'$ | $r_5' = -0.88$ | $d_5' = 0.05$ | 1.62 | 60 |
|  | $r_5 = 0.75$ |  |  |  |
| $L_5''$ |  | $d_5'' = 0.17$ | 1.81 | 25 |
|  | $r_5'' = 24.62$ |  |  |  |
|  | $s_3 - s_5 - s_6 = 1.50$ |  |  |  |

* * * * *